United States Patent [19]

Kipp

[11] Patent Number: 4,780,160
[45] Date of Patent: Oct. 25, 1988

[54] CERAMIC TUBE FOR HIGH TEMPERATURE USE

[75] Inventor: Guenther W. Kipp, Redwood City, Calif.

[73] Assignee: GTE Products Corporation, Stamford, Conn.

[21] Appl. No.: 83,324

[22] Filed: Aug. 10, 1987

[51] Int. Cl.⁴ .................. B32B 31/06; B32B 31/16
[52] U.S. Cl. ....................... 156/89; 156/153; 156/293; 156/304.2; 156/304.5
[58] Field of Search .............. 156/89, 153, 157, 293, 156/294, 304.2, 304.5; 285/32, 80, 289, 382.1, 382.2, 398, 423

[56] References Cited

U.S. PATENT DOCUMENTS 514,432 2/1894 Anderson ..................... 285/289
2,106,578 1/1938 Schwartzwalder et al. ......... 156/89
4,171,832 10/1979 Metcalfe ...................... 285/187
4,396,445 2/1983 Sasaki et al. .................. 156/89

FOREIGN PATENT DOCUMENTS 146985 8/1984 Japan ........................ 156/89

Primary Examiner—Caleb Weston
Attorney, Agent, or Firm—James Theodosopoulos

[57] ABSTRACT

A long alumina ceramic tube having good linearity is made by longitudinally joining shorter alumina tubes at the ends thereof. The end of one shorter tube is ground to reduce wall thickness and is inserted into the end of another tube which has also been ground to reduce wall thickness. There are aligned peripheral grooves in the ground ends for the purpose of holding ceramic cement. The joined ends of the tubes are then fired at a high temperature to form a secure joint therebetween.

2 Claims, 2 Drawing Sheets

CERAMIC TUBE FOR HIGH TEMPERATURE USE

This invention concerns the manufacture of a ceramic tube for high temperature use. In some applications, it is required that the tube be quite lengthy and quite true in linearity. In one such application, where a copper vapor atmosphere is maintained within the tube at 1500° C., a particular tube is 9' long by 3" inside diameter. In the past, the tube was made by slip casting in one piece. Because of the 9' length, it was difficult to maintain the desired degree of linearity, especially where the slip cast ceramic composition had to be sintered at a high temperature. This invention discloses a method of making such a tube having improved linearity.

In this invention, the desired tube is made by first making shorter tubes having predetermined dimensions and then joining the ends of the shorter tubes under conditions that will provide the improved linearity. The reason for the use of the shorter tubes is that it is easier to maintain linearity in a shorter tube than it is in a longer tube. The ends of the tubes are made to fit inside each other. The ends of the tubes are then fitted together, with a thin layer of a ceramic composition therebetween, and then sintered at a high temperature to obtain a strong joint. The sintering temperature can be sufficiently high to obtain diffusion at the joint and to approach obtaining a monolithic structure at the joint.

Figure 1:
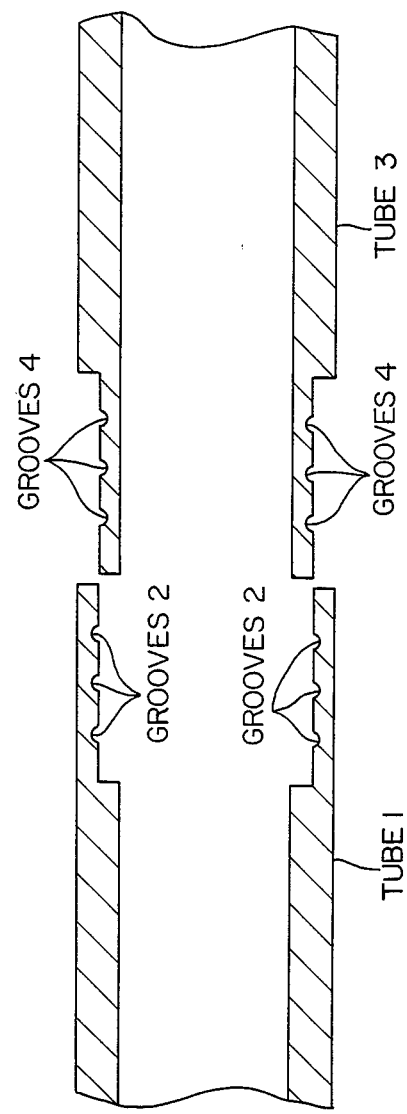

In the drawing, FIG. 1 shows the ends of two tubes just before one is inserted into the other.

Figure 2:
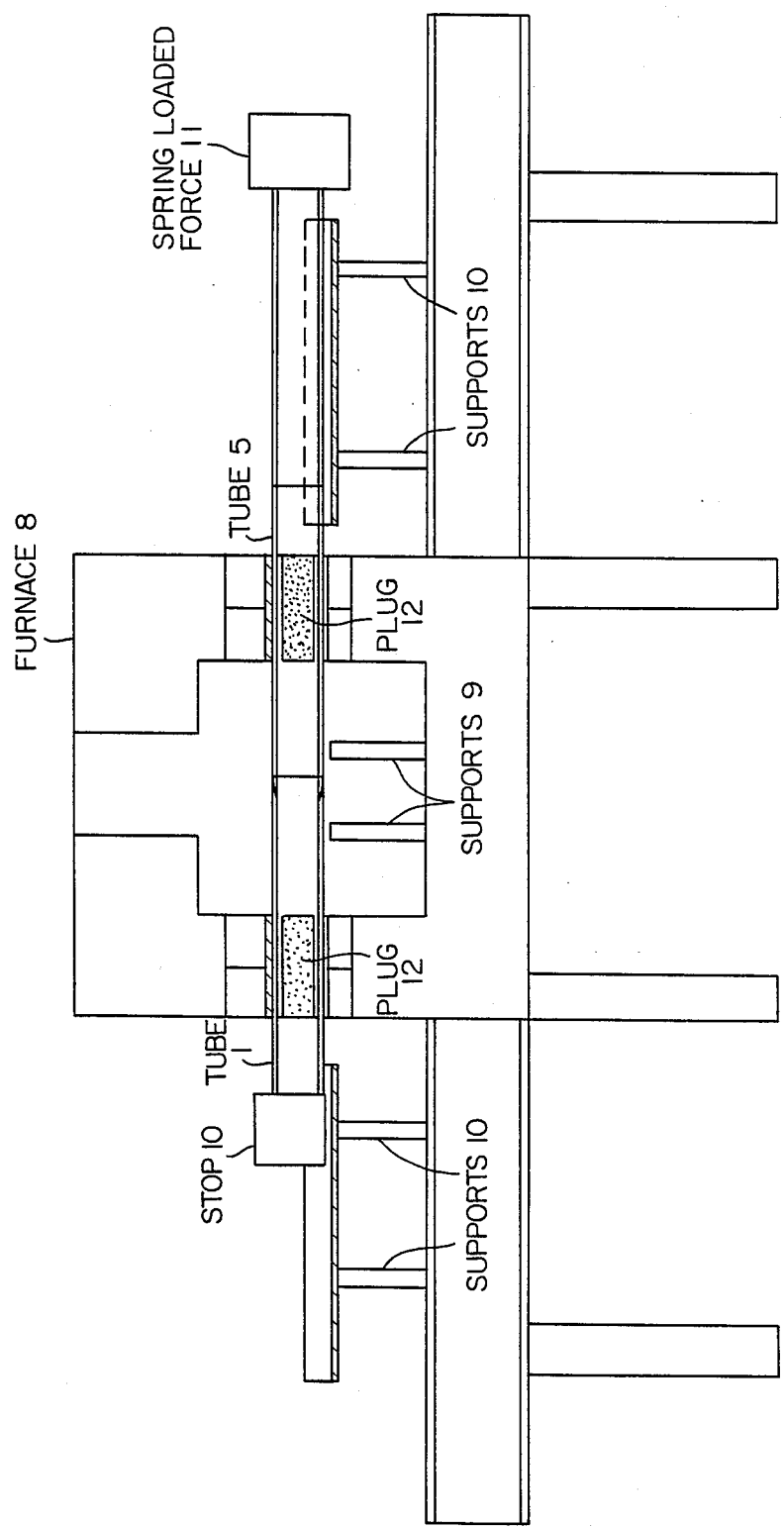

FIG. 2 shows the tubes positioned in a furnace for firing.

In one example, alumina tubes, two feel long, were made by isostatic pressing A1998C (99.8% $Al_2O_3$) alumina powder on a mandrel, removing the pressed tube, and then fully sintering at 1700° C. The diameter of the mandrel was carefully selected so that after sintering, which resulted in about 20% shrinkage, the sintered tube had the desired inside diameter of 3" and had, after outside machining, a wall thickness of about 187 mils. The tube was then cut to a length of 22.˙..

The inside surface for a length of one-half inch at the right hand end of tube 1 was then ground down to reduce the wall thickness about in half, as shown in FIG. 1. Three spaced apart peripheral grooves 2, each about 20 mils wide by 10 mils deep, were then ground into said inside surface of tube 1.

Then the outside surface of the left hand end of tube 3 was ground down to reduce the wall thickness about in half, also for a length of one-half inch, as shown in FIG. 1. Then three spaced apart peripheral grooves 4, also about 20 mils wide by 10 mils deep, were ground into said outside surface of tube 3.

The ground surfaces and the grooves were such that when the left end of tube 3 was inserted into the right end of tube 1, the fit was close with slight clearance between the ground surface, and grooves 2 aligned with grooves 4. The purpose of this alignment was to provide a locking seal when the grooves were filled with a joining compound.

The ground surface and grooves of tubes 1 and 3 were coated and filled with a joining compound consisting of finely ground calcium aluminate, alumina and an organic vehicle, and then the left end of tube 3 was inserted into the right end of tube 1. The excess joining compound was wiped off and the joint was then fired at a high temperature to bond the tubes together, as shown in FIG. 2.

Tubes 1 and 3, butted together, were placed inside clamshell furnace 8, the butted ends being about at the center of furnace 8 and the other ends of each tube protruding outside furnace 8. There were adjustable alumina supports 9 inside furnace 8 and adjustable supports 10 outside the furnace to support the entire lengths of tubes 1 and 3. Prior to firing the furnace, supports 9 and 10 were adjusted to align tubes 1 and 3 for accurate linearity. There was a stop 10 at the left end of tube 1 and a spring loaded or hydraulic force 11 at the right end of tube 5 in order to place the tubes in longitudinal compression during firing. This ensured that tube 3 remained inserted in tube 1. Alumina plugs 12, slightly smaller than the I.D. of the tubes, were inserted inside tubes 1 and 3 to about 12" from the joint. There purpose was to reduce radiation heat loss. The furnace, burning natural gas and air, was then ignited and the joint fired at about 1750° C. for about three hours. The calcium aluminate has a liquid phase at about 1500° C., and the liquid phase reacts with the alumina of the alumina tube to form a higher alumina composition, which is non-liquid and more refractory than the starting calcium aluminate.

Additional tubes of about the same length could be joined to the other ends of tubes 1 and 3 in a similar manner to provide the desired 9' tube having improved linearity.

I claim:

1. The method of making an elongated alumina tube having a predetermined length comprising the steps of preparing a first and a second sintered alumina tube each having a predetermined wall thickness and each having a length shorter than said predetermined length, grinding a short length of the outside surface at one end of the first of said sintered alumina tubes to about half of said predetermined wall thickness, grinding spaced apart peripheral grooves on said ground outside surface, grinding a short length of the inside surface at one end of the second of said sintered alumina tubes to about half of said predetermined wall thickness, grinding spaced apart peripheral grooves on said ground inside surface, coating both of said ground surfaces and grooves with a ceramic joining compound containing alumina, inserting the ground end of the first tube into the ground end of the second tube to form a close fit joint with slight clearance between said two ground surfaces and with the grooves of the two tubes in alignment with each other, and firing the joint at a high temperature to form a secure joint between the ground surfaces.

2. The method of claim 1 wherein the two sintered alumina tubes are aligned for linearity within a furnace prior to firing.

* * * * *